Feb. 7, 1967  J. A. WINKER  3,302,906
POSITIVE DESTRUCTION DEVICE FOR BALLOON
Filed March 8, 1965
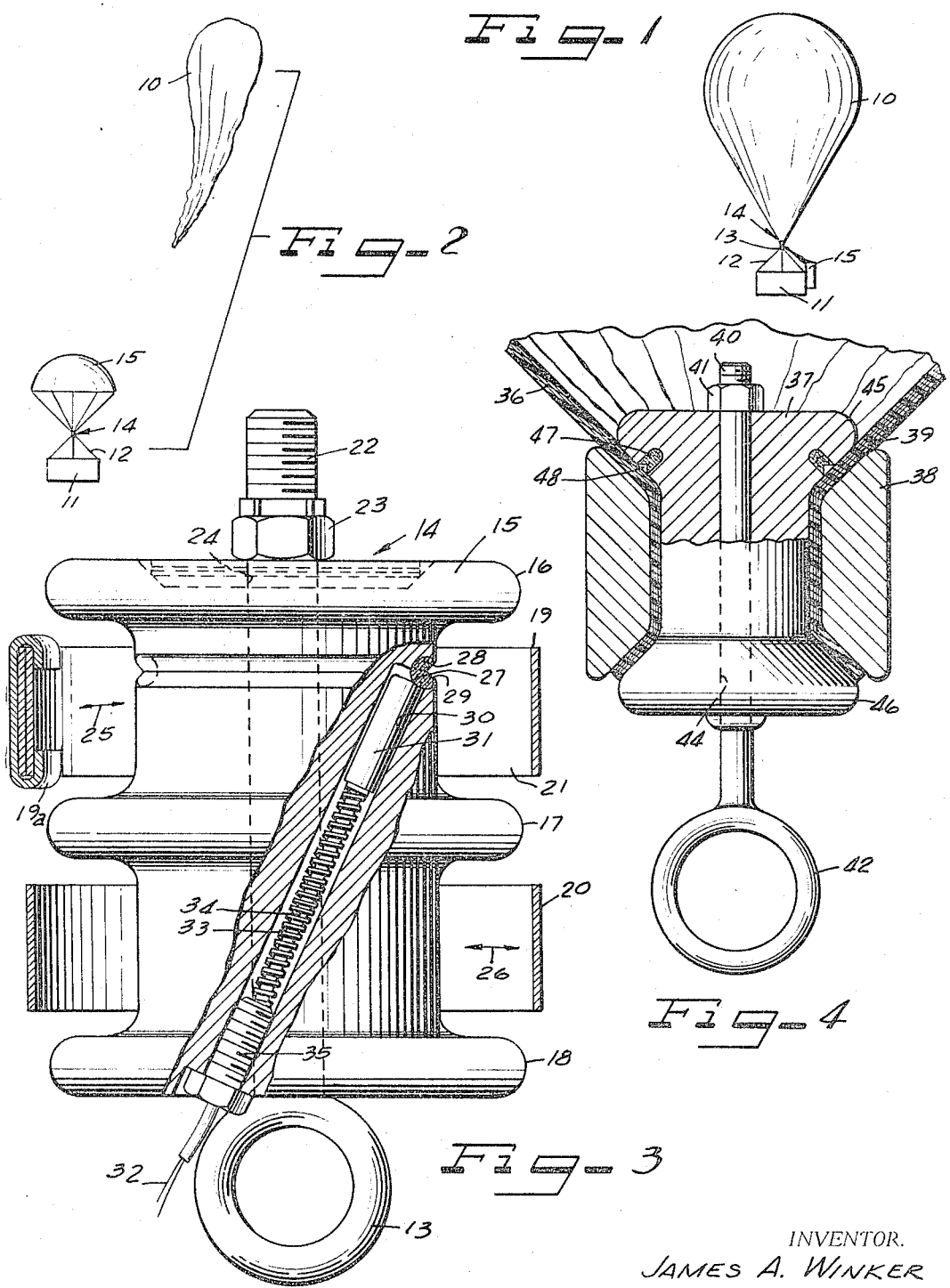
INVENTOR.
JAMES A. WINKER ![United States Patent Office] 3,302,906
Patented Feb. 7, 1967

3,302,906
POSITIVE DESTRUCTION DEVICE FOR BALLOON
James A. Winker, Sioux Falls, S. Dak., assignor to Raven Industries, Inc., Sioux Falls, S. Dak., a corporation of South Dakota
Filed Mar. 8, 1965, Ser. No. 437,920
11 Claims. (Cl. 244—32)

The present invention relates to improvements in free flight balloons and particularly to an improved positive destruction device for destroying a balloon at the end of the flight.

In high altitude free floating balloon flights such as of the type used to carry instrumentation aloft, it is necessary to provide a flight termination means wherein the further flight of the balloon can be positively ended and the instrumentation carried by the balloon recovered. Positive termination or destruction of the flight at a predetermined time which is controlled by timing devices from the balloon or from the ground are essential in order to be able to recover the instrumentation or to end the flight at some critical time relative to its altitude or length of flight.

A typical method of separating a balloon payload is to sever the suspension line which connects the parachute to the eyebolt which supports the parachute which in turn supports the load beneath a balloon. This remains an effective and simple method for flight termination, but it has a drawback. After separation, the balloon usually rises rapidly until it bursts; then falling in pieces. The problem is that occasionally it does not burst and remains floating for hours or days. Such a derelict can descend into the airlanes and become a hazard to aircraft. Thus, it has been required in some instances that a positive destruct device be provided which will prevent derelicts. This is an improtant reason for the destruct device of the present invention.

Efforts to provide balloon destruction devices have included employing a rip panel arrangement wherein sections are torn from the balloon to permit the escape of gas and termination of flight. Disadvantages are encountered in this structure since it results in providing a weakened area in the fabric. Other balloon destruction devices have not proven entirely satisfactory since they require complex structure which is not wholly reliable or involve structure and methods which are complex or which do not rapidly terminate the flight.

It is accordingly an object of the present invention to provide an improved destruct device which can be employed without interfering with the normal flight of the balloon and which does not adversely effect the strength of the balloon material.

A further object of the invention is to provide a balloon destruct mechanism which can be used on either end of a balloon but which can advantageously be used to terminate a balloon flight and to release the payload from the balloon and permit it to float down on a parachute.

A further object of the invention is to provide an improved end fitting which incorporates a balloon destruct device capable of being operated electrically to cause a substantial instantaneous freeing of the end fitting from the balloon and a release of the balloon so that it will lose its gas and float to the earth.

Other objects, advantages and features will become more apparent with the disclosure of the principles of the invention in connection with the disclosure of the preferred embodiments thereof in the specification, claims and drawings, in which:

FIGURE 1 is an elevational view of a balloon carrying a payload in flight;

FIGURE 2 is an elevational view of the balloon after a destruct device constructed and operating in accordance with the principles of the present invention has been activated to release the payload;

FIGURE 3 is a detailed elevational view, with portions broken away, showing features of construction of a balloon end fitting in accordance with the invention; and FIGURE 4 is an elevational view with portions in section of another form of end fitting.

On the drawings:

As illustrated in FIGURE 1, a balloon 10 is filled with a lifting gas such as helium or hydrogen and is generally formed of a lightweight thin flexible plastic material such as polyethylene constructed in a manner well known to those versed in the art. At the lower end of the balloon, a payload 11 is supported which may contain instrumentation for measuring factors encountered on high altitude flights such as temperature, radiation and similar phenomena. For supporting the payload 11 load lines 12 are provided connected to an eyelet 13 at the base of a balloon end fitting 14.

For recovering the instrumentation and permitting it to float gently down to earth without suffering shock on landing, a parachute 15 is provided carried with the payload during normal flight. When the flight is ended, the parachute is deployed in the manner illustrated in FIGURE 2. To terminate the flight in accordance with the principles of the present invention, the end fitting is cut loose from the balloon 10 so that the balloon material floats away and the payload 11 floats gently down to earth. In cutting away the end fitting 14, the lower end of the balloon envelope is opened. Frequently, the balloon envelope 10 will upend itself so that the lifting gas will escape and the balloon material will drop to earth.

The end fitting 14 is shown in greater detail in FIGURE 3 and includes an inner balloon end securing member in the form of a generally cylindrical core or spool 15 with an upper annular flange 16, an intermediate flange 17 and a lower flange 18. The core 15 may be of a casting of material such as aluminum, or other suitable material and has a generally smooth outer surface with the flanges being smooth so as not to damage the thin balloon material which is gathered annularly around the core and tightly pressed thereto to seal the lower end of the balloon.

The core is surrounded by annular outer balloon end securing rings or members 19 and 20. The upper ring 19 is positioned between the flanges 16 and 17 and the lower ring 20 is positioned between the flanges 17 and 18. The rings 19 and 20 and the core 15 thus define a balloon material clamping space 21 between them.

In assembling the end fitting on the balloon, the material is first gathered evenly around the core 15 and the clamping rings 19 and 20 are then brought into place. These clamping rings may be of metal strapping which can be drawn tightly around the balloon material by applying pulling forces to the ends of the strapping in the direction shown by the opposed arrowed lines 25 and 26. Securing clips such as 19a are then applied to the strapping holding the ends together to maintain it in its clamping position around the balloon material. A clip similar to 19a is also applied to the ends of the ring 20. As will be appreciated other forms of clamping rings may be employed. Generally, the relationship between the inner spool 16 and the outer rings 19 and 20 must be such so that a clamping space is defined therebetween which permits rigidly clamping the balloon material to hold the end fitting 14 to the material and to seal the balloon. As will be appreciated, the end fitting can also be employed at the top of the balloon.

For the purposes of supporting a payload from the lower end of the balloon, a load bolt 22 extends through a centrally located bore 24 in the center of the spool 15. A nut 23 on the upper threaded end of the bolt 22 holds it in place, and the bolt has the eyelet 13 at its lower end for receiving the load lines 12 carrying the payload 11. When the fitting is used at the upper end of the balloon, the eyelet 13 may be omitted, or may be employed for attaching lifting hooks for handling the balloon.

For purposes of cutting loose the fitting and severing the balloon material, an annular band of explosive charge 28 is exposed to the material in the clamping space 21. The explosive charge is preferably held in an annular recess 27 cut in the outer surface of the spool 15 adjacent the upper end thereof. This location is significant since the material will be cut adjacent the end of the end fitting 14 so that the cut end of the balloon material will slip out from between the outer surface of the spool 15 and the inner surface of the ring 19.

It is possible to locate the annular explosive charge in the outer ring 19 where a heavier ring is used although supporting the charge on the spool is preferred.

While the explosive charge can be located somewhat higher than shown on the spool, the preferred location is just below the upper edge of the clamping ring 19 so that the charge faces the inner surface of the ring which acts as a cutting anvil in supporting the material against the charge, permitting a sharp explosive cutting action to sever the balloon material. The material is severed by the explosive force of the charge and, usually being of thermoplastic, is also severed by the heat of the charge thus insuring positive and reliable separation of the material above the end fitting from that which remains clamped in the end fitting.

The recess in which the explosive charge is supported is preferably circular in cross-section with the surface of the recess constituting an arc greater than 180° so as to provide a slightly overhanging lip at the upper and lower edge of the recess for holding the charge in place.

It has also been discovered that an improved cutting effect results by shaping the charge with an outer tapered or V-shaped recess facing directly at the opposing inner surface of the ring 19. This V-shaped recess creates a "shaped charge" effect, also known as the "Munroe" effect wherein substantially the full force of the charge is directed in a straight line extending radially outwardly in the direction of the V-shaped recess. In other words, the detonation front produces a convergent shock wave and extremely high pressures and temperatures result. This does not waste the explosive force of the charge but propagates the shock wave in a straight line for a superior cutting of the balloon material. The pyrotechnic explosive can be neither fast burning or slow exploding, and can conveniently be formed of a plastic explosive which can be molded into the groove. An explosive such as the type known as RDX is well suited for the purpose and other explosive charges which will be known to those versed in the art may be used.

The charge of pyrotechnic material in the groove is exploded by a firing means or igniter 31. This is located in an angularly tilted generally axially extending bore 30 through the core 15 with the bore 30 extending upwardly from the lower end of the core 15. The igniter squib 31 is provided with a stem 34 and a coil compression spring 33 surrounds the stem, being supported by a nut 35 screwed upwardly into the lower end of the bore 30. The spring 33 holds the igniter in place in operating relationship relative to the charge 28. The bore intersects the annular groove 27 so that the firing of the igniter will explode the charge 28. The end fitting can be reused and the igniter simply replaced by removal of the screw 35 and replacement with a fresh igniter 31 and another explosive charge 28.

FIGURE 4 illustrates another form of end fitting with a central spool 37 surrounded by an annular ring 38.

The ring 38 may be in sections with means for drawing the sections together, or the central spool may be in upper and lower sections with the parts clamped against the upper and lower surfaces of the ring 38.

In either arrangement, the ring 38 coacts with the spool 37 to provide a balloon material clamping space 39 therebetween. The spool 37 has upper and lower flanges 45 and 46 which coact in aiding holding the balloon material against the ring 38.

For supporting a load from the spool, an axial bore 44 extends through the spool to receive a load bolt 40 having a nut 41 threaded on the upper end. At the lower end of the bolt is an eyelet 42 for connecting the load lines.

The spool has an annular channel or recess 47 cut in its outer surface adjacent the upper end and facing the inner surface of the ring 38. An explosive charge 48 is positioned in the recess 47 and is preferably arranged with the V-shaped groove in the outer surface of the charge to achieve the shaped charge effect and enhance the cutting action of the exploding charge. An igniter, not shown, but similar to the one shown in FIGURE 3 is provided for exploding the charge 48.

In summary, in the arrangement of FIGURE 3, an annular explosive charge 28 is positioned in the groove 27 and an electrical igniter 31 is placed in the bore 30. Wires 32 lead to control mechanism such as a radio-activated switch carried with the payload and actuated from the ground for firing the charge 28. The balloon material is gathered around the core 15 and clamped in place by the rings 19 and 20 and the balloon is sent aloft carrying the payload in the manner shown in FIGURE 1. At the termination of the flight, the charge 28 is fired immediately and uniformly cutting the balloon maetrial for 360° around the spool and releasing the payload to float down on the parachute 15 as shown in FIGURE 2.

Thus, it will be seen that I have provided an improved end fitting structure which permits reliably terminating a balloon flight with positive destruction of the balloon and yet which does not interfere with the normal function of the fitting and securing the payload to the balloon. The mechanism does not require additional units to be carried with the balloon which add weight or add to the complexity of mechanism required and the mechanism is recoverable after each flight.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A balloon end fitting for securing the material of a gathered end of a balloon envelope comprising, a circular inner member having an outer surface, an annular outer member having an inner surface facing said outer surface and forming a balloon material clamping space therebetween, clamping means connected to said members for drawing them together and clamping the balloon material which extends into one end of the members between said surfaces, said balloon material being heat disintegratable plastic, a recess in the surface of one of the members facing the surface of the other member located adjacent said one end of the members, at a location sufficiently close to the end where the balloon material is sufficiently loosely clamped so that an end will slide from between the clamping members when severed, said surface of said other member facing the groove being at substantially right angles thereto and forming a broad opposing surface for the balloon material, a charge of explosive in said recess, and a firing means operatively positioned relative to the explosive charge whereby the explosive material disintegrates the balloon material due to the pressure and heat being generated for severing the balloon material to open the balloon at the location of said member and separate the members from the balloon.

2. A balloon end fitting for securing the material of a gathered end of a balloon envelope comprising, an inner balloon end securing member, an outer balloon end securing member surrounding the inner member defining a clamping space therebetween for receiving and holding gathered balloon envelope material, formed of a heat disintegratable plastic, one of said members having a recess therein facing the other member, a charge of explosive in said recess facing the balloon material in the clamping space, said recess being spaced from the ends of said members a short distance so that the balloon material between the recess and the end of said members is loosely clamped and will pull from within the members when the material is severed, and a firing means operatively positioned relative to the explosive charge for severing the balloon material by pressure and heat to open the balloon at the location of said members and separate the members from the balloon.

3. A balloon end fitting for securing the material of a gathered end of a balloon envelope comprising, an inner balloon end securing member, an outer balloon end securing member surrounding the inner member defining a clamping space therebetween for receiving and holding gathered balloon envelope material of a heat disintegratable plastic, a charge of explosive exposed to the balloon material in said space, said explosive positioned adjacent the end of said clamping space so that the gathered balloon envelope material will slide from within the clamping space when severed, and a firing means operatively positioned relative to the explosive charge for severing the material by pressure and heat to open the balloon at the location of said members.

4. A balloon end fitting for securing the material of a gathered end of a balloon envelope comprising, an inner balloon end securing member, an outer balloon end securing member surrounding the inner member defining a clamping space therebetween for receiving and holding gathered balloon envelope material, one of said members having a recess therein facing the other member, said recess having a wall tapering outwardly toward an opening mouth facing the surface of the other member, a charge of explosive in said recess facing the balloon material in the clamping space, said recess located near the end of said clamping space so that the balloon and the material pulls from within the clamping space when severed, and a firing means operatively positioned relative to the explosive charge for severing the balloon material to open the balloon at the location of said members and separate the members from the balloon.

5. A balloon end fitting for securing the material of a gathered end of a balloon envelope comprising, a circular inner member having an outer surface, an annular outer member having an inner surface facing said outer surface and forming a balloon material clamping space therebetween, clamping means connected to said members for drawing them together and clamping the balloon material which extends into one end of the members between said surfaces, a recess in the surface of one of the members facing the surface of the other member located adjacent said one end of the members, the space between members being substantially uniform at the location of said recess with the surface opposite the recess forming a cutting anvil surface, said recess located near the end of said clamping space so that the balloon material will slide from within the clamping space when severed, a charge of explosive in said recess, and a firing means operatively positioned relative to the explosive charge for severing the balloon material to open the balloon at the location of said member and separate the members from the balloon.

6. A balloon end fitting for securing the material of a gathered end of balloon envelope comprising, an inner circular core member, an outer annular clamping ring defining with the core member an annular balloon material clamping space, an annular recess in the surface of the core member facing the clamping ring, a charge of explosive in said recess exposed to the balloon material in said clamping space, an axially extending bore through the core member leading to said recess, a charge igniter in said bore adjacent the recess, and spring means holding the igniter in its location.

7. A balloon end fitting for securing the material of a gathered end of balloon envelope comprising, an inner circular core member having an outwardly extending flange at the upper end, an annular clamping ring defining with the core member an annular balloon material clamping space, an annular recess formed in the core member below the flange, a charge of explosive exposed to the balloon material in the clamping space, an axially extending bore through the core member, an electrical igniter in the bore for exploding the charge, a spring bearing against the igniter holding it in position in the bore, and a threaded nut supporting the spring member and removable from the bore for changing the igniter.

8. A balloon end fitting for securing the material of a gathered end of a balloon envelope comprising, an inner balloon end securing member, an outer balloon end securing member surrounding the inner member defining a clamping space therebetween for receiving and holding gathered balloon envelope material, a charge of explosive exposed to the balloon material in the space adjacent the upper end of said members, a firing means operatively positioned relative to the explosive charge for severing the balloon material to release the members from the balloon, means on the inner balloon end securing member for attaching a payload to the balloon to be supported therefrom, and a parachute attached to said means whereby a load will be supported by the parachute when said balloon end securing member is released by severing the balloon material by the action of said explosive charge.

9. A balloon end fitting for securing the material of a gathered end of balloon envelope comprising, an inner balloon end securing member, an outer balloon end securing member surrounding the inner member defining a clamping space therebetween for receiving and holding gathered balloon envelope material, a charge of explosive supported on one of said members exposed to the balloon material in said space, a shaped tapered recess in the surface of the explosive charge facing the balloon material so that a shaped charge explosion will occur developing a cutting front for severing the material in said space, and a firing means operatively positioned relative to the explosive charge for detonating the charge.

10. A balloon and fitting for securing the material of a gathered end of a balloon envelope comprising, an inner generally cylindrical spool with spaced annular flanges, an annular securing ring outwardly of the spool for clamping balloon material thereto between the flanges, and means defining an annular recess near the top of the spool facing outwardly toward the top of the ring for receiving explosive material so that when the material is exploded the balloon material clamped between the ring and spool will be cut, said recess located sufficiently near the top of the spool so that the baloon material above is loosely clamped and will be withdrawn from the spool when severed.

11. A balloon and fitting for securing the material of a gathered end of a balloon envelope comprising, a central spool having upper and lower flanges with a material clamping space therebetween, an annular ring surrounding the spool holding the balloon material against the clamping space, and means defining an annular recess near the top of the spool facing outwardly for receiving explosive material and located so that balloon material clamped thereabove is loosely held and will slip from the spool upon firing of the explosive material and severing of the balloon material.

References Cited by the Examiner
UNITED STATES PATENTS

| | | | |
|---|---|---|---|
| 2,889,775 | 6/1959 | Owen | 102—21.6 |
| 2,924,147 | 2/1960 | Bohl et al. | 244—31 X |
| 3,119,578 | 1/1964 | Borgeson et al. | 244—31 |
| 3,131,635 | 5/1964 | Steinmetz et al. | 102—49 |
| 3,145,657 | 8/1964 | Shrout et al. | 102—49 |
| 3,244,104 | 4/1966 | Mills et al. | 102—24 |

MILTON BUCHLER, *Primary Examiner.*

T. MAJOR, *Assistant Examiner.*